United States Patent [19]

Arens

[11] Patent Number: 4,502,319

[45] Date of Patent: Mar. 5, 1985

[54] MULTI-TESTER FOR WATER TREATMENT METERING APPARATUS

[75] Inventor: Hans Arens, Wertingen, Fed. Rep. of Germany

[73] Assignee: 501 Grunbeck Wasseraufbereitung GmbH, Hochstadt, Fed. Rep. of Germany

[21] Appl. No.: 482,995

[22] PCT Filed: Sep. 7, 1982

[86] PCT No.: PCT/EP82/00194
§ 371 Date: Mar. 25, 1983
§ 102(e) Date: Mar. 25, 1983

[87] PCT Pub. No.: WO83/00924
PCT Pub. Date: Mar. 17, 1983

[30] Foreign Application Priority Data

Sep. 11, 1981 [DE] Fed. Rep. of Germany ....... 3136112

[51] Int. Cl.³ ............................................. G01F 25/00
[52] U.S. Cl. ............................................ 73/3; 73/168
[58] Field of Search ...................................... 73/3, 168

[56] References Cited

U.S. PATENT DOCUMENTS

| | | | |
|---|---|---|---|
| 2,959,954 | 11/1960 | Roberts | 73/3 |
| 3,455,143 | 7/1969 | Shamp | 73/3 |
| 3,541,837 | 11/1970 | Davis et al. | 73/3 |
| 4,073,304 | 2/1978 | Lerner et al. | 73/3 X |
| 4,152,922 | 5/1979 | Fransisco, Jr. | 73/3 |
| 4,266,426 | 5/1981 | Gandini | 73/3 X |
| 4,331,262 | 5/1982 | Snyder et al. | 73/3 X |
| 4,389,886 | 6/1983 | Korczak | 73/168 |

FOREIGN PATENT DOCUMENTS

| | | | |
|---|---|---|---|
| 865882 | 4/1961 | United Kingdom | 73/3 |
| 2057283 | 1/1981 | United Kingdom | 73/3 |

Primary Examiner—Gerald Goldberg
Assistant Examiner—Tom Noland
Attorney, Agent, or Firm—Donald Brown

[57] ABSTRACT

A testing appliance (10) is provided for a metering apparatus (1), the latter being used, in particular, for the aftertreatment of water. The testing appliance is designed in a manner such that it can be connected both to the electrical portion and to the metering line of the metering apparatus and simulates the functions of the metering apparatus in a manner such that it is possible to check every one of these functions.

7 Claims, 2 Drawing Figures

MULTI-TESTER FOR WATER TREATMENT METERING APPARATUS

DESCRIPTION

The invention relates to a testing appliance for a metering apparatus.

Metering apparatuses of the type which are used, in particular, for the aftertreatment of water, must be tested at defined intervals. In doing so, various functions must be tested, namely the metering accuracy, that is to say the rate at which the metered flow is delivered, the presence of adequate operating voltages, the triggering of the metering pump, the functioning of the indicator lamps, and the pressure developed by the metering pump. In addition, in order to perform maintenance at the same time, it may be necessary to flush the metering system with warm water. For this purpose, the apparatus is opened, and the individual functions are tested by means of appropriate instruments.

The object of the invention is to provide a testing appliance which enables, in a simple manner, all the functions of the metering apparatus to be tested and which, in particular, renders the opening of the metering apparatus, for this purpose, superfluous. Morever, it is intended that it should be simple to flush the metering apparatus.

This object is achieved by means of a testing appliance for a metering apparatus, which appliance comprises, according to the invention, a control unit which can be connected to the metering apparatus, as well as a measuring device which can be connected to the outlet of the metering apparatus.

Further features and advantages of the invention are evident from the description of an illustrative embodiment, by reference to the Figures, in which.

Figure 1:
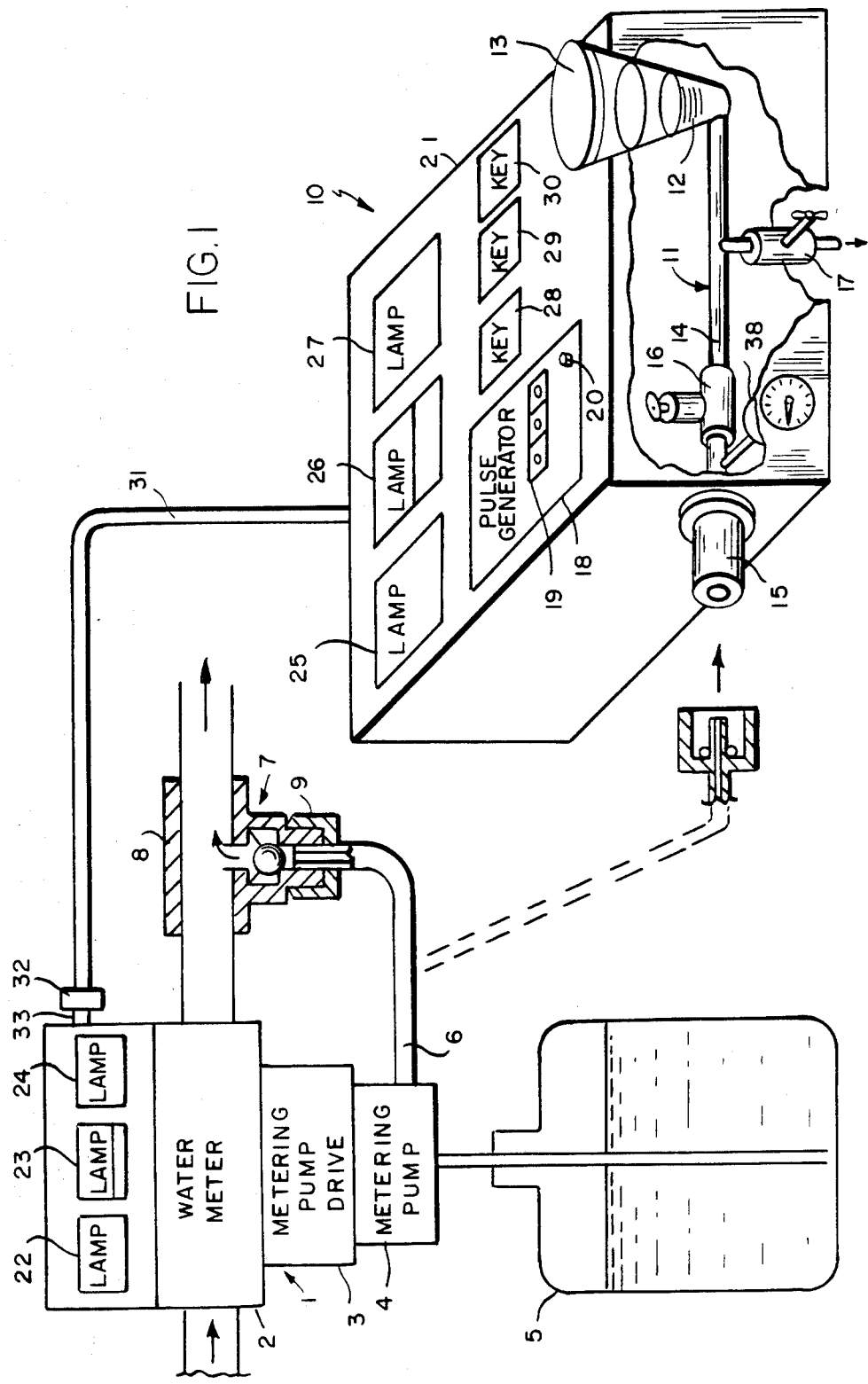
FIG. 1 shows a representation, partially in perspective, of a metering apparatus with the testing appliance.

The metering apparatus 1 possesses, in the conventional manner, a water meter 2, a metering-pump drive 3, and a metering pump 4. The pulses coming, as a function of the flow-rate, from the water meter 2 are applied to the input side of the metering-pump drive. The metering pump 4 is connected to a stock reservoir 5, from which, in normal operation, the chemical to be metered is drawn off by suction. The metering pump 4 leads, via a metering line 6, to a metering valve 7 which is provided on the outlet side of the water line 8. At its free end, the metering line 6 possesses an appropriate coupling 9, by means of which the metering line can be screw-connected to the metering valve.

The testing appliance 10 possesses a measuring device 11, with a measuring container 13 carrying a scale 12. At its base, the measuring container 13 is connected to a feed line 14 which is connected, at its other end, to a connection part 15, the dimensions and design of which correspond to the connection part of the metering valve 7, so that it is possible to connect the coupling 9 to the connection part 15. A manometer 38 and a pressure-holding valve 16 are provided in the feed line 14, in succession to the connection part 15, and a drain valve 17 is provided between this pressure-holding valve and the measuring container 13.

Figure 2:
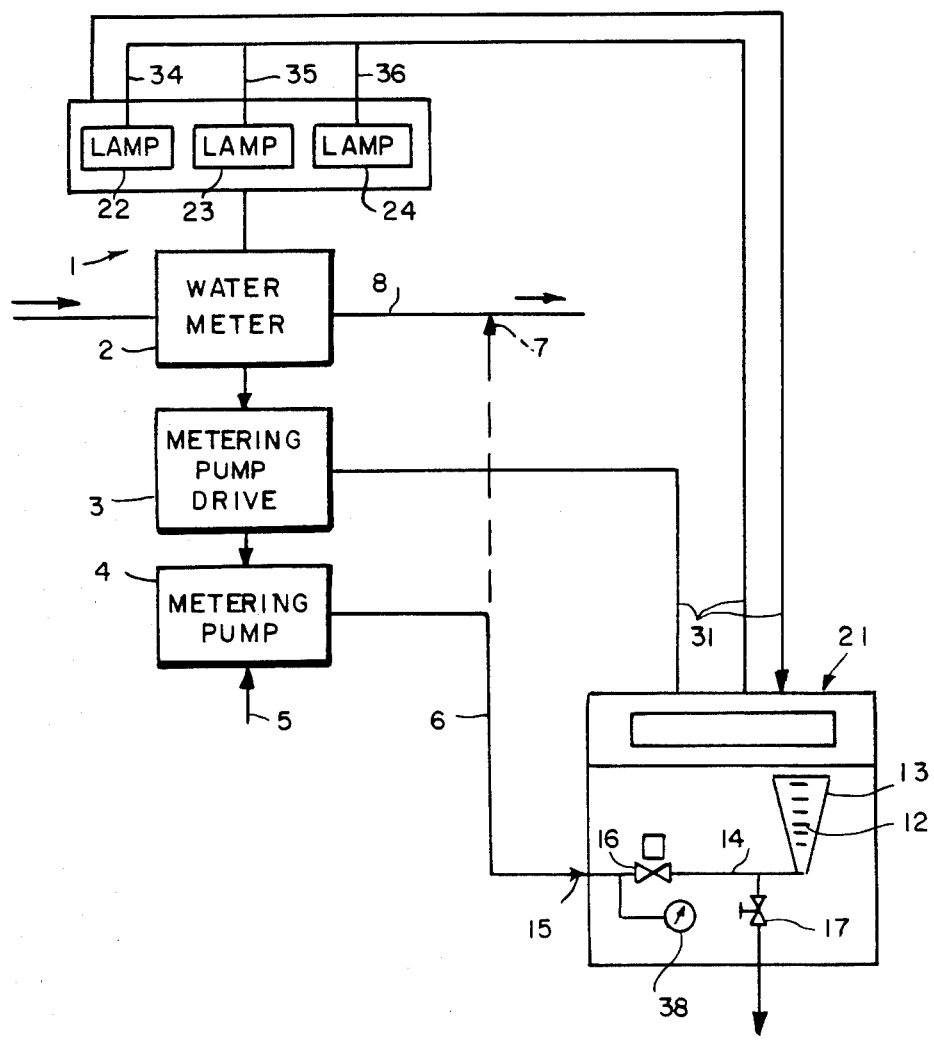
FIG. 2 shows a representation of the testing appliance and of the metering apparatus, in the form of a block circuit diagram.

The testing appliance 10 further includes a control unit 21 with a pulse generator 18. The output terminal of the pulse generator can be connected to an input terminal of the metering-pump drive 3. The pulse generator 18 is designed in a manner such that it is possible to adjust the pulses, and it possesses a pulse counter 19 and a resetting device 20. In addition, the control unit 21 possesses indicator lamps 25, 26, 27, corresponding to the indicator lamps 22, 23, 24 of the metering apparatus, in particular for indicating that the apparatus is operating, the metering cycles of the pump 4, and a shortage of the chemical. The indicator lamps 25, 26, 27 can be connected to the corresponding indicator lamps 22, 23, 24 by means of lines 34, 35, 36. This enables the testing appliance 10 to supply a test voltage to the lamps 22, 23, 24 to test whether they are operating. In addition, a key 28 is provided for the purpose of starting the pulse generator 18, a key 29 is provided for testing the functioning of the control lamps 22 to 27, and a key 30 is provided for manually generating water-metering pulses. The output connections from the control unit 21, and from the keys and indicator lamps, are led in a cable 31 which possesses a connector 32 at its free end, by means of which it can be connected, via a plug 33, to the corresponding parts of the metering apparatus. In FIG. 1, the cable 31 is connected to the metering apparatus, while the metering line 6 is still connected to the valve 7. In FIG. 2, the metering line 6 is connected to the measuring device 11, and the control unit 21 is connected to the metering apparatus, the latter being connected, in the conventional manner, to a power supply which is not shown. The control unit is connected to the power supply of the metering apparatus by means of a line 37 which is led within the cable 31.

In order to test the metering apparatus, the testing appliance 10 is connected by means of the cable 31, and by means of the connection of the coupling 9 to the connection part 15. The indicator lamp 25 then lights, parallel to the indicator lamp 22, in order to indicate that the appliance is operating. Parallel to the indicator lamp 23 the indicator lamp 26 indicates the metering cycles, of the pump 4 by flashing on and off. The indicator lamps 27 and 24 simultaneously indicate a shortage of metering agent, as soon as there is an interruption in the supply of metering agent from the reservoir 5.

In order to test whether the water meter and the pulse generator are serviceable, water is allowed to pass through the line 8. If the water meter and the pulse generator are functioning satisfactorily, the flow of water through the line 8 will cause metering agent to be pumped into the measuring container 13, in proportion to the quantity of water which has flowed through.

In order to test the metering-pump drive 3, and the metering pump 4, the pulse generator 18 is switched on by means of the key 28, and the pulse generator of the water meter is simultaneously switched off. Metering fluid is pumped into the measuring container 13, in proportion to the number of pulses supplied by the pulse generator 18. Conclusions can be drawn with regard to the functioning of the abovementioned units, 3 and 4, from the relation between the pulses and the liquid level in the measuring container 13. The pulse generator 18 is preferably designed in a manner such that it automatically switches off after 100 pulses have occurred. The resetting key 20 is operated in order to reset the counter. The pressure-holding valve 16 is preferably designed to be adjustable, thus enabling tests to be carried out to determine up to which back pressure the metering pump and its drive operate satisfactorily.

The measuring marks on the scale 12 are a measure of the individual metered quantities corresponding to the pulse intervals in the case of various pulse-type water meters with different nominal bores, for example:

Nominal bore 1" I=0.33 liter per pulse
Nominal bore 1.25" I=0.5 liter per pulse
Nominal bore 1.5" I=0.85 liter per pulse
Nominal bore 2" I=1.5 liters per pulse In order to enable the metered quantities to be tested at all nominal bores, the measuring container 13 is designed with a conical shape, thus reducing its overall height. After completing each measurement, or after each readjustment of the metering pump, the measuring container 13 is emptied via the drain valve 17.

In order to carry out the operation of flushing the metering apparatus with warm water, which likewise forms part of its maintenance, the metering pump 4 is connected to a warm water reservoir, instead of to the stock reservoir 5, and the metering-pump drive is operated, either via the water meter 2, or the pulse generator 18, until adequate flushing has been performed. The coupling 9 is then again detached from the connection part 15, and connected to the valve 7, and the connector 32 is withdrawn from the plug 33. The operation of testing and flushing the metering apparatus is then completed.

I claim:

1. A testing appliance for a metering apparatus, said metering apparatus comprising a flow meter disposed in a main stream for providing control signals as a function of flow rate, and a metering pump having an input connected to said flow meter and an output connected to said main stream for pumping fluid into the main stream in correspondence with said control signals provided by said flow meter, and said testing appliance comprising:
    a control unit having a control signal generator generating simulated control signals corresponding to said control signals provided by said flow meter, said control unit having an output which is connectable with said input of said metering pump, such that said simulated control signals are fed to said metering pump in place of the control signals provided by said flow meter, and a measuring device having an input which may be connected with said output of said metering pump, said measuring device measuring the quantity of fluid pumped in response to said simulated control signals.

2. The testing appliance of claim 1, wherein said control signal generator provides simulated control signals which are adjustable to simulate different flow rates.

3. The testing appliance of claim 1, wherein said control signal generator comprises a pulse generator providing simulated control pulses to said output of said control unit.

4. The testing appliance of claim 1, comprising a plug for connecting a cable connected with said output of said control unit with said input of said metering pump and a connection member connected with said input of said measuring device for connecting the output of said metering pump to said input of said measuring device.

5. The testing appliance of claim 1, wherein said measuring device comprises a measuring container of conical shape having an inlet connected with said input of said measuring device.

6. The testing appliance of claim 1, wherein said measuring device comprises a manometer and a pressure-holding valve.

7. The testing appliance of claim 1, wherein said control unit comprises means for generating a test voltage and supplying said test voltage to displays provided at said metering apparatus for displaying operational conditions of said metering apparatus.

* * * * *